Jan. 9, 1951        N. K. CHAMBERLIN        2,537,737
DETECTION OF LEAKS IN PIPE LINES
Filed Dec. 23, 1944
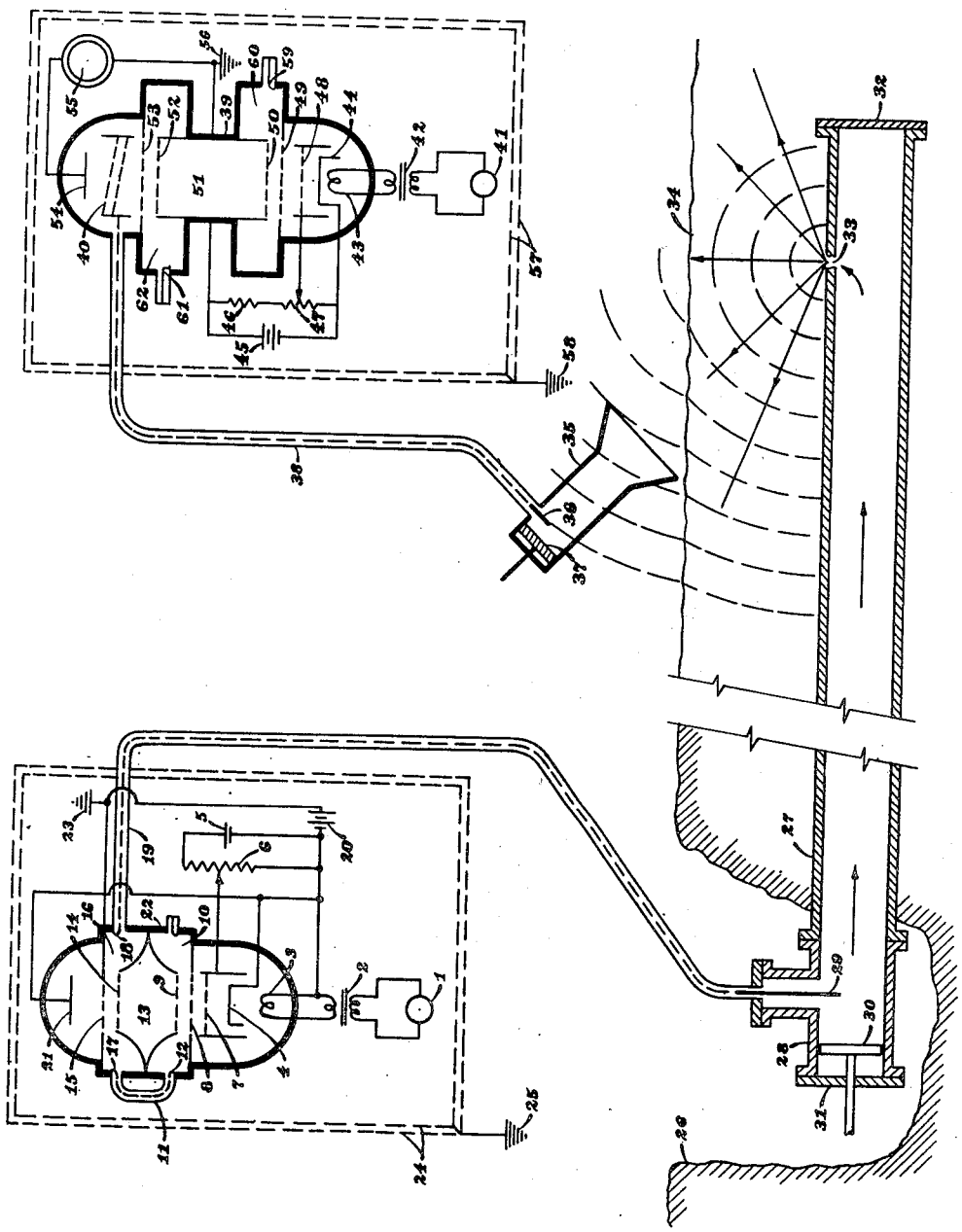
Attest
John G. Buty
Andrew T. Zodl
Inventor
Newell K. Chamberlin
By Norbert E. Buch
Attorney Patented Jan. 9, 1951

2,537,737

UNITED STATES PATENT OFFICE 2,537,737

DETECTION OF LEAKS IN PIPE LINES

Newell K. Chamberlin, Philadelphia, Pa., assignor to The Atlantic Refining Company, Philadelphia, Pa., a corporation of Pennsylvania Application December 23, 1944, Serial No. 569,608

4 Claims. (Cl. 175—183)

The present invention relates to a method of detecting leaks in a conduit or pipe line, and particularly a subsurface pipe line for conveying fluids such as hydrocarbon oil, gas, and the like.

In accordance with the present invention, ultra high frequency electromagnetic waves are generated and introduced into the pipe line, such waves having a frequency adapting them for propagation through the pipe line. Intense electric and magnetic fields are produced within the pipe line, and due to the nature of the high frequency power, such fields are practically confined by the pipe line, but are not completely confined in the event that there is a hole or source of leakage in the line whereby the waves or components thereof are emitted or radiated into nearby space. The radiations from the hole or leak are then detected by exploring the region adjacent the pipe line with means sensitive to the radiations, the energy of which may be suitably transformed into a visual or audible signal which indicates proximity to the source of leakage.

When waves of proper frequency are introduced into a pipe line, their propagation down the line depends upon losses due to current flowing in the inside skin of the pipe. In pipe lines made of steel the attenuation of the current is much higher than in the case of materials of better conductivity, for example, copper, therefore in the case of steel pipe lines it is necessary to introduce the high frequency waves at shorter intervals, or in other words, to examine shorter lengths of pipe line for leakage. Where a copper pipe or pipe having similar conductivity will transmit the waves for many miles with a reasonable loss by attenuation, steel pipes or pipes of relatively poor conductivity will transmit, for the same loss, a distance of only several thousand feet. However, in the case of steel pipe lines this difficulty may be overcome to a considerable extent by applying to the inner wall of the line a thin coating of a material adapted to provide a good conducting surface, thereby reducing attenuation and increasing the distance of transmission.

In order to accomplish the purpose of this invention, it is necessary to set up an electric or magnetic field inside the pipe line, which field will have strong tangential components at the skin, so that when a hole occurs in the inside skin of the pipe line, this field will leak out of the hole and may be subsequently detected. This may require a complex wave, i. e., a combination of several normal waves, or a wave rich in harmonics. In general, for propagation to occur in a high frequency field inside a pipe line, the wave length of the radiation used must be approximately equal to or less than twice the internal diameter of the pipe. Longer waves will not propagate, but shorter waves of particular types will propagate. The longest wave length that will propagate is referred to as the "critical" wave length, or in terms of frequency, as the "low frequency cute off." One formulation of this relation is:

$$(f°)_{nm} = \frac{1}{2\pi\sqrt{ue}} \frac{2r_{nm}}{d}$$

where $(f°)_{nm}$ is the critical frequency for mode "nm" wave, "u" is permeability, "e" is dielectric constant, "d" is inside diameter of pipe, and "$r_{nm}$" is Bessel root of $J_n$ where "n" refers to the order of the Bessel function and "m" refers to the rank of the root. To generate the wave lengths required in accordance with the present invention, use is made of velocity modulated tubes such as "Klystrons," which type of tube was developed by R. H. and S. F. Varian and was first reported in the Journal of Applied Physics, 10, 321, May 1939. Such velocity modulated tubes may be employed as oscillators, amplifiers, and detectors, depending upon the mode of operation.

My invention may be further understood with reference to the accompanying drawing, which illustrates diagrammatically a system suitable for carrying out my method of leak detection.

Referring to the drawing, an alternating current generator 1 supplies power to a transformer 2 for appropriate transformation to power suitable for heating filament 3 of the velocity modulated tube 22 which functions as the wave generator. The filament 3 heats a cathode 4 which in turn gives off a cloud of electrons. A voltage from source 5 is adjusted by resistor 6 so that grid 7 is at a proper positive potential with respect to cathode 4. This applied field and the physical structure of the tube causes the electrons about cathode 4 to acquire a high, nearly average velocity and intensity in the direction from cathode 4 to grid 7 and thereby form a beam. This electron beam passes through grids 8 and 9 and thus across the throat of resonant chamber 10. An oscillating electric field is present in chamber 10 as a result of feedback of energy through coaxial cable 11 to terminal 12, source of which current will be described hereinafter. This oscillating field affects the "buncher" zone between grids 8 and 9, and hence affects the electron beam there present. This field has the effect of slowing down fast moving electrons, and speeding up slow moving electrons, thus bunching them into groups. This "bunch" then travels ahead through the field free drift space 13 and then enters grids 14 and 15, thus passing across the throat of resonant "catcher" chamber 16. When the properly bunched electrons cross this throat, their passage excites an oscillating field in chamber 16 of such a nature that some of the energy can be fed back through terminal 17, coaxial cable 11 and terminal 12 into chamber 10 as the source of current above mentioned. The waves produced in these resonant chambers have a frequency dependent upon the geometry of the space, and the space is adjustable as to volume. The balance of the energy is available for output power through terminal 18 into coaxial cable 19. A positive potential from source 20 on grid 15 assists in accelerating the electrons and causes them to continue on to the collector plate 21 from which they return to cathode 4. Grid 15 and the shell of the tube 22 are grounded at 23. The whole apparatus is surrounded by multiple shields 24 which are grounded at 25, which is at the same potential as 23.

The power output of the tube 22, i. e., the ultra high frequency electromagnetic wave feeding through coaxial cable 19 is led to the point of application through excavation 26 at the end of the buried pipe line 27 provided with T-joint 28 carrying terminal 29 and adjustable tuning piston 30 to adjust the pipe line chamber to resonance, if necessary. The ends of the line under test are blanked off by flanges 31 and 32. The power is fed through terminal device 29 to the inside of the pipe line. Here, depending on the type of terminal device, a suitable electric field is set up so that a wave will travel down the pipe in the direction indicated by the arrow. In this manner, intense magnetic and electric fields may be produced inside the pipe line 27. Due to the nature of the high frequency power, such fields will be practically confined by the metal pipe line. Where there may be a hole in the pipe as at 33, these waves or a part thereof, will escape through hole 33 into surrounding space, and will thus appear at ground level 34 and pass into the atmosphere In order to detect the point of leakage, the region adjacent the pipe line is explored with apparatus sensitive to the escaping wave. A directional horn 35 provided with receiving antenna 36 and tuning piston 37 can be oriented so as to receive the wave emitted from the pipe line leak. This wave enters the throat of the horn which is adjusted to resonance by piston 37. The wave then sweeps over the receiving antenna 36 of a type dependent on the wave being employed, and establishes a potential on antenna 36. This voltage then travels through coaxial cable 38 and into a detector tube 39 to control grid 40, maintained at a suitable potential with respect to cathode 44 by a battery and resistor (not shown). This detector tube is provided with an alternating current generator 41 which supplies power to a transformer 42 for appropriate transformation to power suitable for heating filament 43. This filament heats cathode 44 which in turn gives off a cloud of electrons. A voltage from source 45 is adjusted through resistors 46 and 47 so that the grid 48 is at a positive potential with respect to cathode 44. This applied field causes the electrons about cathode 44 to acquire a high average velocity in the direction from cathode 44 to grid 48, and thereby form a beam. This electron beam then passes through grids 49, 50, space 51, and grids 52, 53, and 40 at various potentials. A collector electrode 54 collects all electrons which the grids allow to pass. When grid 40 is negative with respect to cathode 44, no electrons reach electrode 54. This collector current is a function of the grid voltage passing through coaxial cable 38 to grid 40, and an indication can be shown on a suitable device such as a meter 55. Electrons then proceed back to the shell of tube 39 which is grounded at 56. The entire detector is surrounded by a multiple shield 57 which is grounded at 58 at the same potential as 56. This detector tube can also be employed as a mixer tube if the voltage is introduced through coaxial cable 38 to terminal 59 and resonant chamber 60, while another local oscillator (not shown) would have its output introduced through terminal 61 into resonant chamber 62.

When the meter 55 indicates flow of current, it will be known that the detector is in the vicinity of the pipe line leak, precautions having been taken to shield both the wave generator and the detector. By adjusting the position of the detector with respect to the pipe line until a signal of maximum intensity is received, the approximate location of the leak may be determined.

The waves that leak out of the hole in the pipe line radiate in all directions, and when the pipe line is buried in the earth, such waves or a portion thereof tend to propagate through to the earth's surface. This distance may vary from several inches to as much as 30 feet, and at substantial depths the attenuation of the waves is high. The limit on attenuation is set by the sensitivity of the detector employed, and where attenuation is too great, for example, at 30 feet, then ground probes may be used which permit insertion of a pickup antenna in the ground as near to the pipe as is possible. Such ground probe may simply comprise a coaxial cable, or wave guide, provided with a terminal electrode. When dealing with weak signals, it may be necessary to amplify the energy picked up by the horn or ground probe with additional tubes of the same type as the oscillator or wave generator 22, with different potentials on the tube elements, such amplifiers being used in conjunction with the detector tube 39. It has been found possible to obtain a high degree of directivity in pickup antenna or horns, and since the antennas for receiving ultra high frequency waves are small, it is feasible to stack many antennas, reflectors, and directors together and thereby increase sensitivity of reception in one direction. The same effect may be obtained if a pickup antenna is disposed within a wave guide terminating in a flared horn or multiple horns, and such horn is mounted on swivels for orientation along a pipe line suspected of leakage. Such directional pickups enable detection of very weak fields as well as giving direction vectors toward the source of leakage.

Since the determination of pipe line leaks depends upon the detection of radiating fields, it is necessary to shield the oscillator or wave generator 22 and its associated equipment and prevent any "leaky" radiation from the oscillator from interfering with the detection operation. This may be accomplished by enclosing the oscillator in one or more highly conductive shields suitably grounded, or the oscillator may be enclosed in a section of metal pipe properly earthed, with provision for a wave guide or coaxial cable to connect the oscillator with the pipe line to be tested. Again, the oscillator may be inserted directly in the pipe line or even passed through the pipe line upon a suitable carriage. The coaxial cables or wave guides for transmitting the ultra high frequency waves from the oscillator or generator to the pipe line may be terminated inside the line in various forms of terminal electrodes or antennas, depending upon the type of wave that is to be introduced into the pipe line. The antenna may be a simple rod or plurality of rods, discs, half discs, or various combinations thereof. In general, bends or minor obstructions in the pipe line do not interfere with wave propagation, and when wave attenuation can be held within reasonable limits, i. e., by improving the conductivity of the pipe line by suitable internal coatings, the pipe line may be employed for communication purposes by utilizing the ultra high frequency or wave guide technique, since the ultra high frequency waves may be modulated, transmitted, and demodulated for transmission of voice or signals. Line filters may also be used for the separation of the various wave modes, and such filters may comprise simple wire frames, the wires of which are so placed as to short circuit a given field and to permit another field to pass through. Several properly oriented antennas in the same line permit multiplex transmission, using frequency modulation, amplitude modulation, or phase modulation.

In applying the method of the present invention to the detection of leaks in a pipe line, it is obvious that the line need not necessarily be buried in the earth, since such method is equally applicable to the detection of leaks in pipe lines supported on or above the earth's surface, for example, pipe lines conveying hydrocarbon gas or other gaseous substances, the point of leakage of which is not readily determinable by visual inspection. In any case, whether the line is buried or not, the same technique is employed, i. e., introduction into the line of ultra high frequency electromagnetic waves having a frequency preferably above 1000 megacycles, and exploration of the line with a portable detector unit capable of picking up the waves or components thereof emitted at the source of leakage, and transforming this energy into a visible or audible signal. Since the detector units are relatively compact, little trouble is experienced in conveying them over the region to be explored, for example, the length of the pipe line.

I claim:

1. The method of detecting a leak in a pipe line, which comprises propagating an ultra high frequency electromagnetic wave through said pipe line, exploring the region adjacent said pipe line with a detector sensitive to said electromagnetic wave, and detecting said electromagnetic wave emitted from the pipe line at the point of leakage.

2. The method of detecting a leak in a pipe line, which comprises propagating an ultra high frequency electromagnetic wave through said pipe line, said wave being of a length not greater than twice the diameter of the pipe line, exploring the region adjacent said pipe line with a detector sensitive to said electromagnetic wave, and detecting said electromagnetic wave emitted from the pipe line at the point of leakage.

3. The method of detecting a leak in a pipe line, which comprises propagating an ultra high frequency electromagnetic wave through said pipe line, passing above said pipe line in the direction in which it extends means sensitive to said electromagnetic wave, and detecting the electromagnetic wave emitted from the pipe line at the point of leakage.

4. The method of detecting a leak in a pipe line, which comprises propagating an ultra high frequency electromagnetic wave through said pipe line, said wave being of a length not greater than twice the diameter of the pipe line, passing above said pipe line in the direction in which it extends means sensitive to said electromagnetic wave, and detecting the electromagnetic wave emitted from the pipe line at the point of leakage.

NEWELL K. CHAMBERLIN.

REFERENCES CITED

The following references are of record in the file of this patent:

UNITED STATES PATENTS

| Number | Name | Date |
| --- | --- | --- |
| 1,933,547 | Drake | Nov. 7, 1933 |
| 2,075,808 | Fliess | Apr. 6, 1937 |
| 2,085,798 | Gerhard | July 6, 1937 |
| 2,206,923 | Southworth | July 9, 1940 |
| 2,218,784 | Billstein | Oct. 22, 1940 |

OTHER REFERENCES

Short Wave and Television, April 1938, pages 669, 706 and 707.